United States Patent [19]
Haest

[11] Patent Number: 5,598,896
[45] Date of Patent: Feb. 4, 1997

[54] VARIABLE GAGE UNDERCARRIAGE ARRANGEMENT

[75] Inventor: Patrick J. Haest, Nalinnes, Belgium

[73] Assignee: Caterpillar Inc., Peoria, Ill.

[21] Appl. No.: 349,109

[22] Filed: Dec. 2, 1994

[51] Int. Cl.$^6$ .................................................. B62D 55/084
[52] U.S. Cl. .......................................................... 180/9.48
[58] Field of Search ................................ 180/9.48, 9, 9.1

[56] References Cited

U.S. PATENT DOCUMENTS

| | | | |
|---|---|---|---|
| 3,712,398 | 1/1973 | Althaus | 180/9.48 |
| 3,820,616 | 6/1974 | Juergens | 180/9.48 |
| 3,894,598 | 7/1975 | Yeou | 180/9.48 |
| 4,132,317 | 1/1979 | Arendt et al. | 180/9.48 X |
| 4,386,673 | 6/1983 | Carter et al. | 180/9.48 X |
| 4,431,074 | 2/1984 | Langerud | 180/9.48 |
| 4,457,388 | 7/1984 | Koehler et al. | 180/9.48 |
| 4,830,562 | 5/1989 | Frederking | 180/9.48 X |

FOREIGN PATENT DOCUMENTS

| | | |
|---|---|---|
| 2084808 | 12/1971 | France . |
| 2051248 | 4/1971 | Germany . |
| 4027435 | 1/1992 | Germany . |

*Primary Examiner*—Brian L. Johnson
*Assistant Examiner*—F. Zeender
*Attorney, Agent, or Firm*—William C. Perry

[57] ABSTRACT

Construction machines have, in some instances been provided with an undercarriage that may be varied in width. The method by which these undercarriages are moved require support personnel, auxiliary equipment and an extensive amount of time to achieve the desired width. The present invention provides an undercarriage of variable gage wherein movement of the undercarriage components, between extreme positions may be obtained in a very timely and efficient manner from within the operator station of the machine.

14 Claims, 6 Drawing Sheets

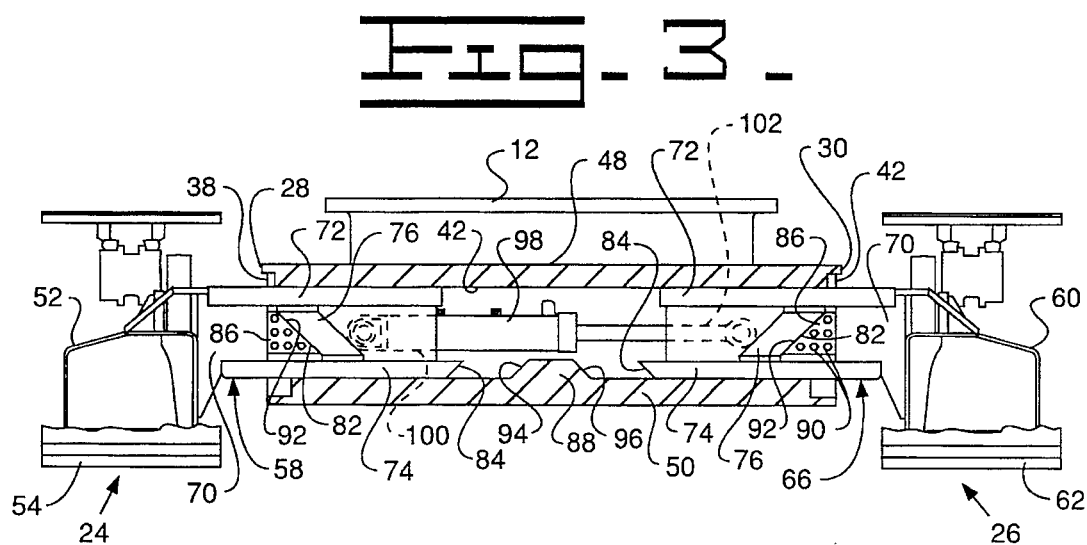
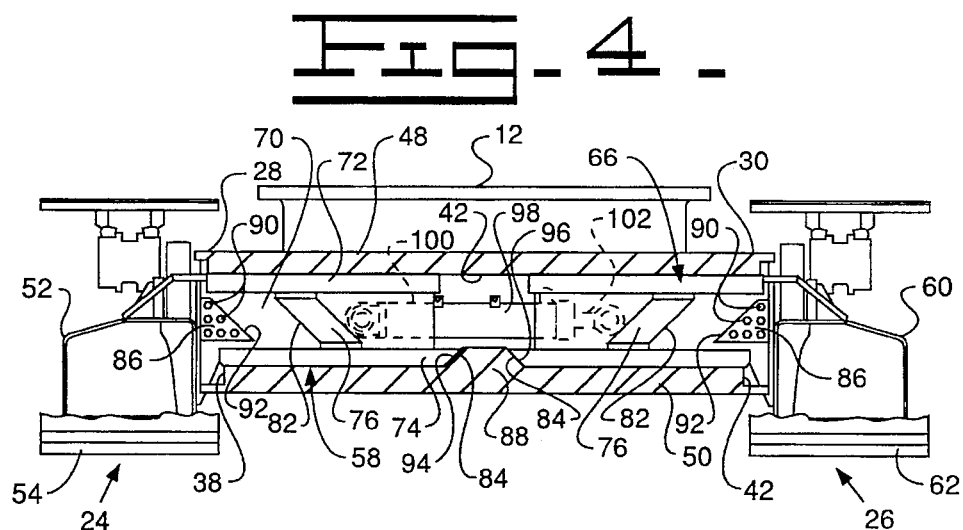

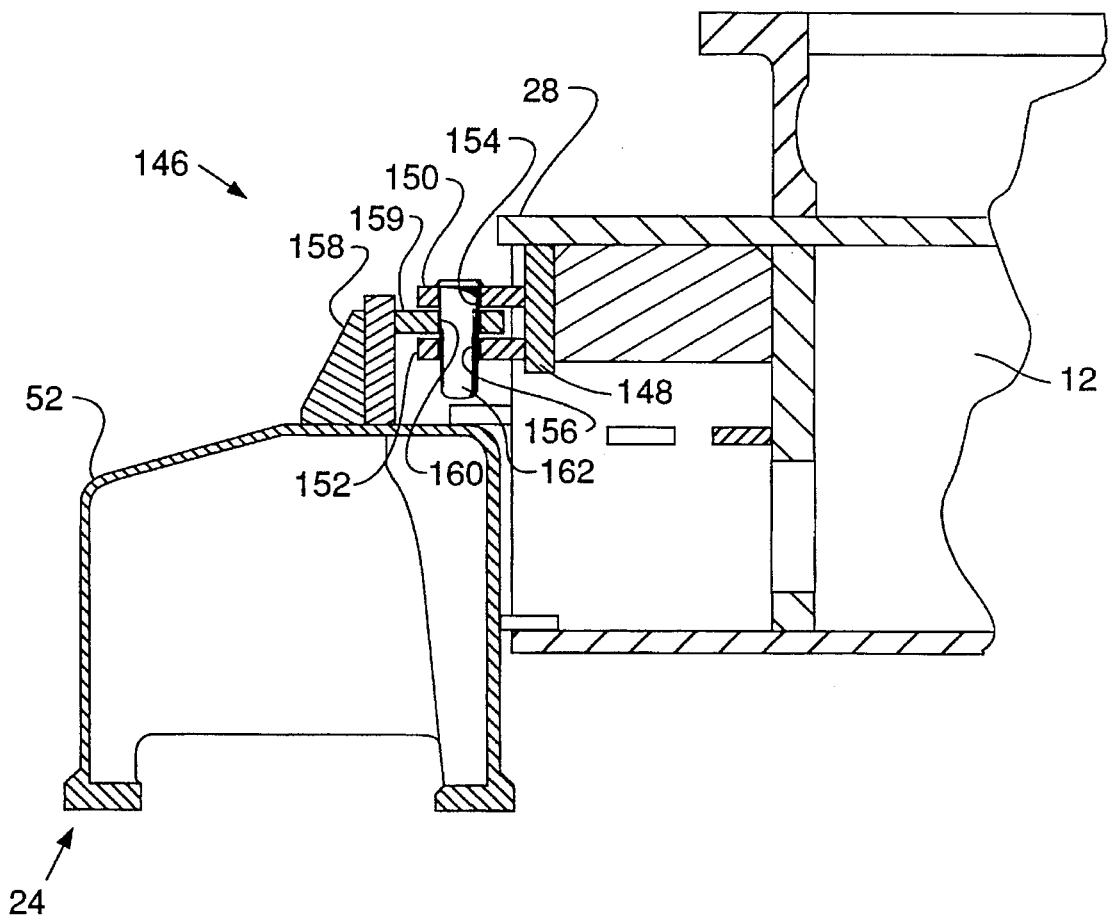

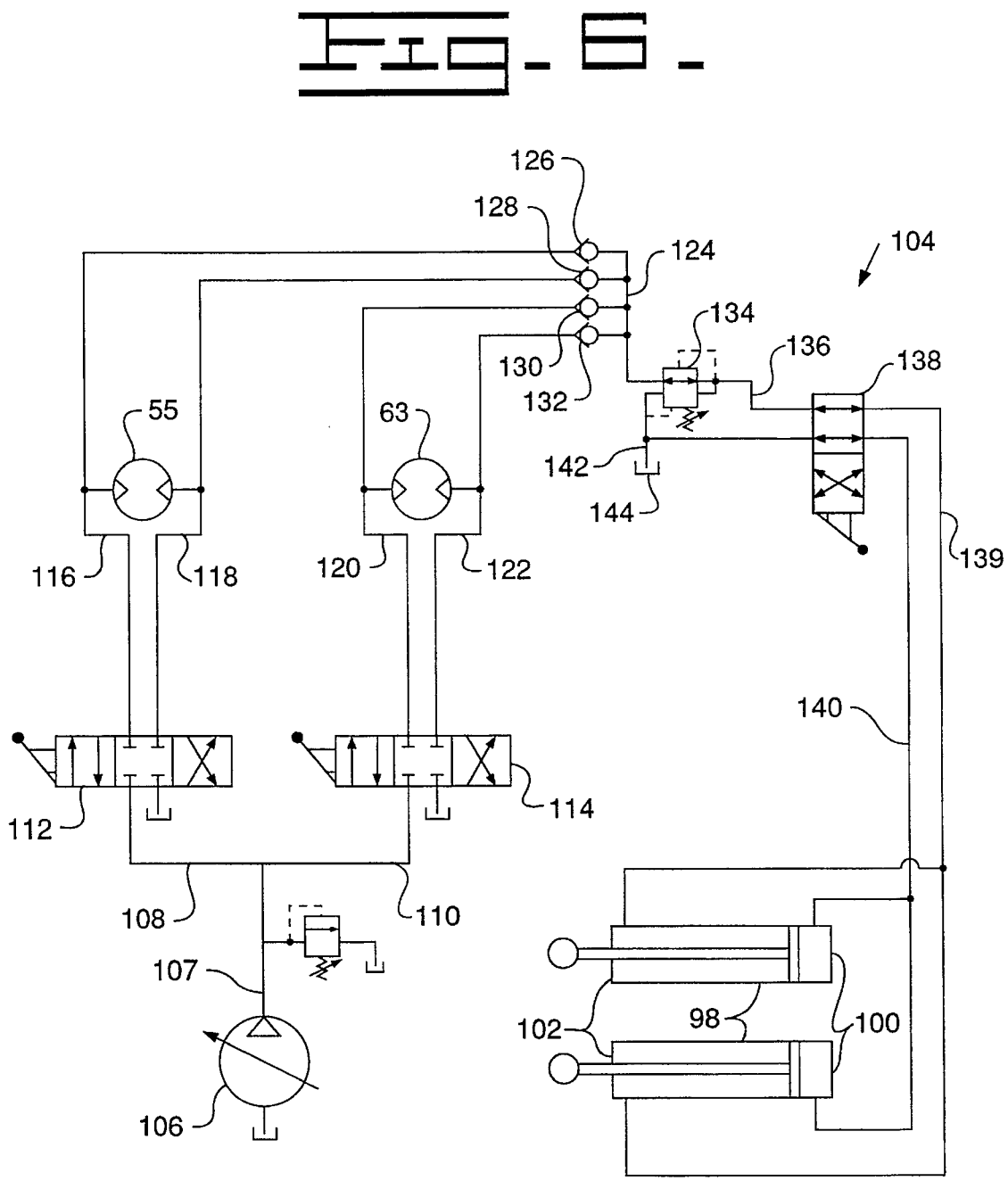
Fig_6_

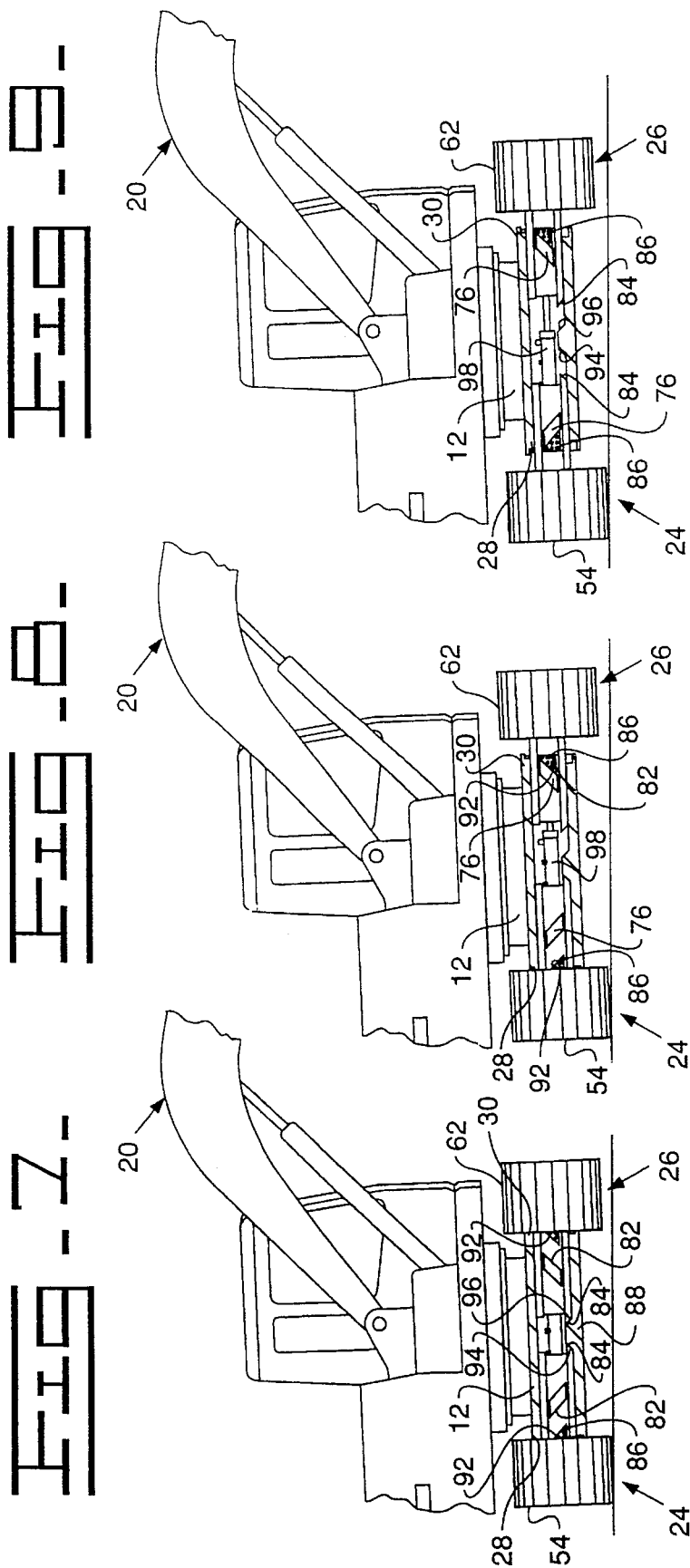

5,598,896

VARIABLE GAGE UNDERCARRIAGE ARRANGEMENT

DESCRIPTION

1. Technical Field

This invention relates generally to an undercarriage for a construction machine and more particularly to an undercarriage whose gage may be of varying widths.

2. Background Art

In the operation of construction equipment, it is normal for a construction machine to handle a variety of tasks that require operating capacities of varying degrees. When the construction machine is a hydraulic excavator, the machine is required in some instances to operate with the linkage and the attached working implement extended over each side of the machine as well as to the front and rear since the linkage mechanism is mounted on a rotating platform. Since the undercarriage of an excavator is normally longer that it is wide, it naturally will have a greater operating capacity to the front and rear than it does when positioned over either side. In many instances the operating capacities of the linkage over the side of the undercarriage is determined by the width of the undercarriage and not the capacity of the hydraulic system. It is, therefore, desirable in many instances to be able to increase the width of the undercarriage thereby increasing the stability and/or the operating capacities of the machine. This has been accomplished in prior designs by removing the bolts that mount the track roller frame to the main frame and positioning a hydraulic cylinder therebetween at a location that is generally centered between the ends of the track roller frame. An auxiliary pump is then connected to the hydraulic cylinder and actuated to extend the track roller frame to a position that is spaced further from the main frame. The bolts are again employed to fix the new location of the track roller frame with respect to the main frame. The same procedure is applied to the track roller frame on the opposite side of the machine. This permits a wider stance for the machine and, thus, increases its operational capacity and stability.

While this method has been known to increase the width of the track roller frames, it requires a substantial amount of time and manpower to complete the process. In addition, since the process usually utilizes several auxiliary components, additional storage space is required. In many instances the components are stored at a location remote from the machine or the job site which only adds to the inconvenience.

The present invention is directed to overcoming one or more of the problems as set forth above.

DISCLOSURE OF THE INVENTION

In one aspect of the present invention, a variable gage undercarriage arrangement for a construction machine is provided that includes a main frame that defines first and second opposing sides. A first subframe is provided that has a traction drive means for propelling the machine mounted thereon and is slidably mounted to the first side of the main frame for relative movement toward and away from said main frame. A second subframe is provided that has a traction drive means for propelling the machine mounted thereon and is slidably mounted to the second side of the main frame on a side opposite the first subframe for relative movement toward and away from the main frame. At least one hydraulic actuator is connected between the first and second subframes and is selectively operable upon actuation of one of the traction drive means to move the first and second subframes from a first position wherein the respective subframes are spaced from one another a first preselected distance to a second position wherein the respective subframes are spaced from one another a second preselected distance.

In another aspect of the present invention, a variable gage undercarriage arrangement for a construction machine is provided that includes a main frame that defines a pair of side portions and a pair of receptacles that extend between the side portions. A first track roller frame is included that has an endless track chain entrained thereabout and a motor for driving the track chain. A pair of beam assemblies is mounted on the track roller frame, each beam assembly being of sufficient size and are spaced from one another a sufficient distance to be slidably received within the openings defined in the first side portion of the main frame. A second track roller frame is included that has an endless track chain entrained thereabout and a motor for driving the track chain. A pair of beam assemblies is mounted to the track roller frame, each beam assembly being of a sufficient size and spaced from one another a sufficient distance to be slidably received within the openings defined by the second side portion of the main frame. A pair of hydraulic cylinders are positioned within each of the receptacles in a manner wherein a first end portion of each cylinder is connected to a respective beam assembly defined by the first track roller frame and a second end portion of each hydraulic cylinder is connected to a respective beam assembly defined by the second track roller frame. The hydraulic cylinders are selectively operable between a first, retracted position wherein the respective track roller frames are spaced from one another a first preselected distance and a second, extended position wherein the respective track roller frames are spaced from one another a second preselected distance. The hydraulic cylinders are operable only upon actuation of one of the track motors.

Yet another embodiment of the present invention includes a method for varying the gage of an undercarriage of a construction machine. The method includes the steps of lifting one of a pair of track roller frames from contact with the ground. The next step includes the actuation of the track motor associated with the raised track roller frame. Next, the pressurized fluid is directed from the track motor to a hydraulic actuator positioned between the pair of track roller frames. With the introduction of pressurized fluid into the actuators, the cylinders may be retracted to position the track roller frames at a first preselected distance away from one another. Alternatively, the actuators may be extended to position the track roller frames at a second preselected distance away from one another.

Therefore, it can be seen that with the arrangement as described above, the undercarriage of a construction machine may be varied in an extremely timely and efficient manner. Further, the undercarriage may be widened to increase the stability and the lifting capacity of the machine without the use of auxiliary tools while the operator remains within the confines of the operating station of the machine.

BRIEF DESCRIPTION OF THE DRAWINGS

FIG. 3 is a diagrammatic sectional view taken along lines 3—3 of FIG. 2 showing the undercarriage components in one position of operation;

FIG. 4 is a diagrammatic sectional view similar to that of FIG. 3 showing the undercarriage components in another position of operation;

FIG. 5 is a diagrammatic sectional view taken along line 5—5 of FIG. 2;

FIG. 6 is a schematic of the hydraulic system of the present invention; and

FIGS. 7–9 show the sequential positioning of the undercarriage components in various stages between their first and second positions.

BEST MODE FOR CARRYING OUT THE INVENTION

Figure 1:
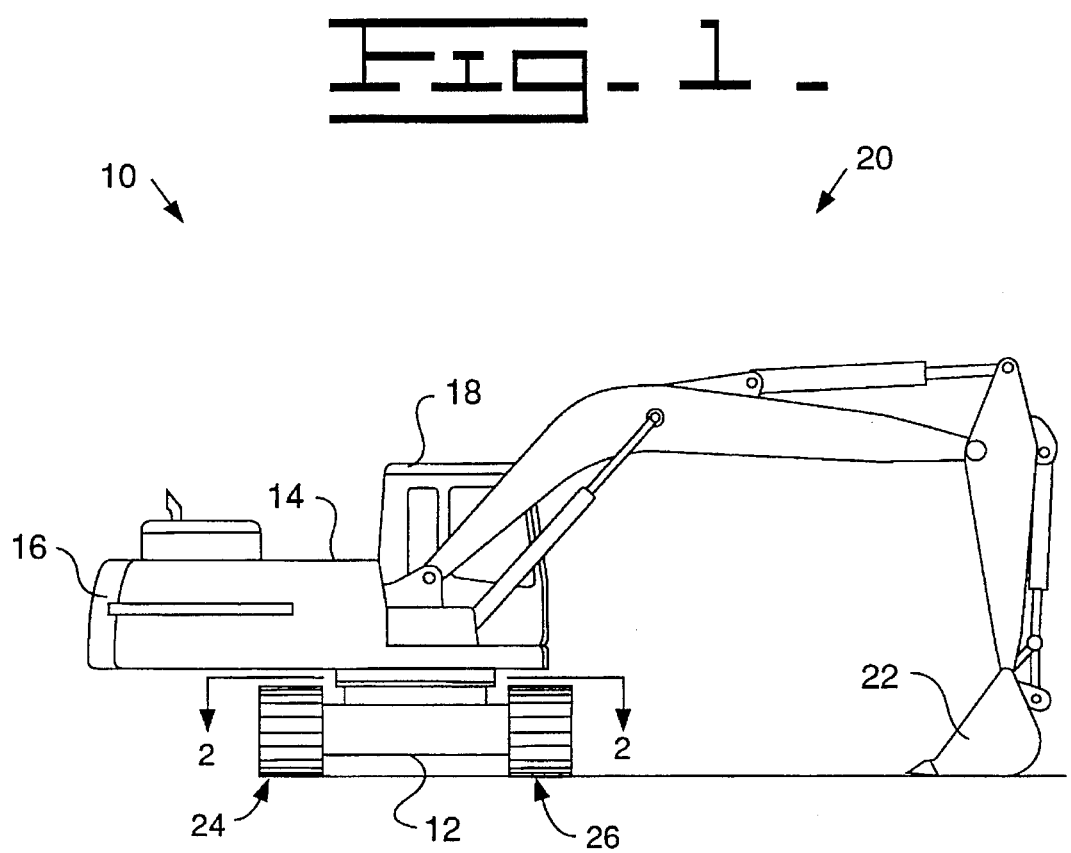
FIG. 1 is a diagrammatic side view of a machine having an undercarriage that embodies the principles of the present invention.

Referring now to the drawings, particularly FIG. 1, it can be seen that a construction machine 10 of the type commonly referred to as a hydraulic excavator is shown. The machine has a carbody or main frame 12 that rotatably supports an upper frame 14 that defines an engine enclosure 16 and an operator station 18. A linkage arrangement, generally indicated by reference numeral 20, is mounted to the carbody 14 and mounts a work implement 22. While the work implement shown in the current illustration is a bucket, it is to be understood that a variety of work implements may be utilized with a variety of linkage arrangements all of which have varying operating parameters and therefore varying degrees of operating capacities. As previously stated, the upper frame is rotatably mounted to the main frame and the linkage arrangement may therefore be rotated 360 degrees and operate on either side as well as the front and rear of the machine. Support for the main frame and movement of the machine is provided by an undercarriage that comprises first and second traction drive assemblies 24 and 26 respectively, that are mounted to opposite sides of the main frame in a manner to be described in greater detail hereinafter. The first traction drive assembly 24 is positioned adjacent a first side 28 portion defined by the main frame 12. Likewise, the second traction drive assembly 26 is positioned adjacent a second side 30 defined by the main frame. The main frame defines a pair of receptacles 32 and 34 respectively, that extend between the first and second sides and are longitudinally spaced from one another. The receptacles define a first pair of openings 36 and 38 on the first side 28 and a second pair of openings 40 and 42 on the second side 30. The receptacles are essentially identical having a generally rectangular configuration that define a pair of generally vertical sidewalls 44 and 46 and an upper and lower wall 48 and 50 respectively.

The first traction drive assembly 24 in the illustrated embodiment is mounted on a first subframe or track roller frame 52. An endless track chain 54 is entrained about the track roller frame and is driven for rotation in either direction about the track roller frame by a track motor 55 (FIG. 6) mounted to the track roller frame in a well known manner. The first track roller frame defines a pair of beam assemblies 56 and 58 that are longitudinally spaced therealong and extend inwardly toward the first side 28 of the main frame. The size and spacing of the beam assemblies 56 and 58 is such that they are positioned for alignment with the openings 36 and 38 defined on the first side 28 of the main frame so that they may be slidably received with the receptacles 32 and 34 for movement toward and away from the main frame.

Likewise, the second traction drive assembly 26 is mounted on a second subframe or track roller frame 60. An endless track chain 62 is entrained about the second track roller frame 60 and is driven in a manner identical to that of the first track roller frame 52 by a track motor 63 (FIG. 6). The second track roller frame also defines a pair of beam assemblies 64 and 66 that are longitudinally spaced and extend inwardly toward the second side 30 of the main frame 12. The size and spacing of the beam assemblies 64 and 66 is such that are positioned for alignment with the openings 40 and 42 defined in the second side 30 of the main frame and are slidably received therewithin for movement toward and away from the main frame.

Figure 2:
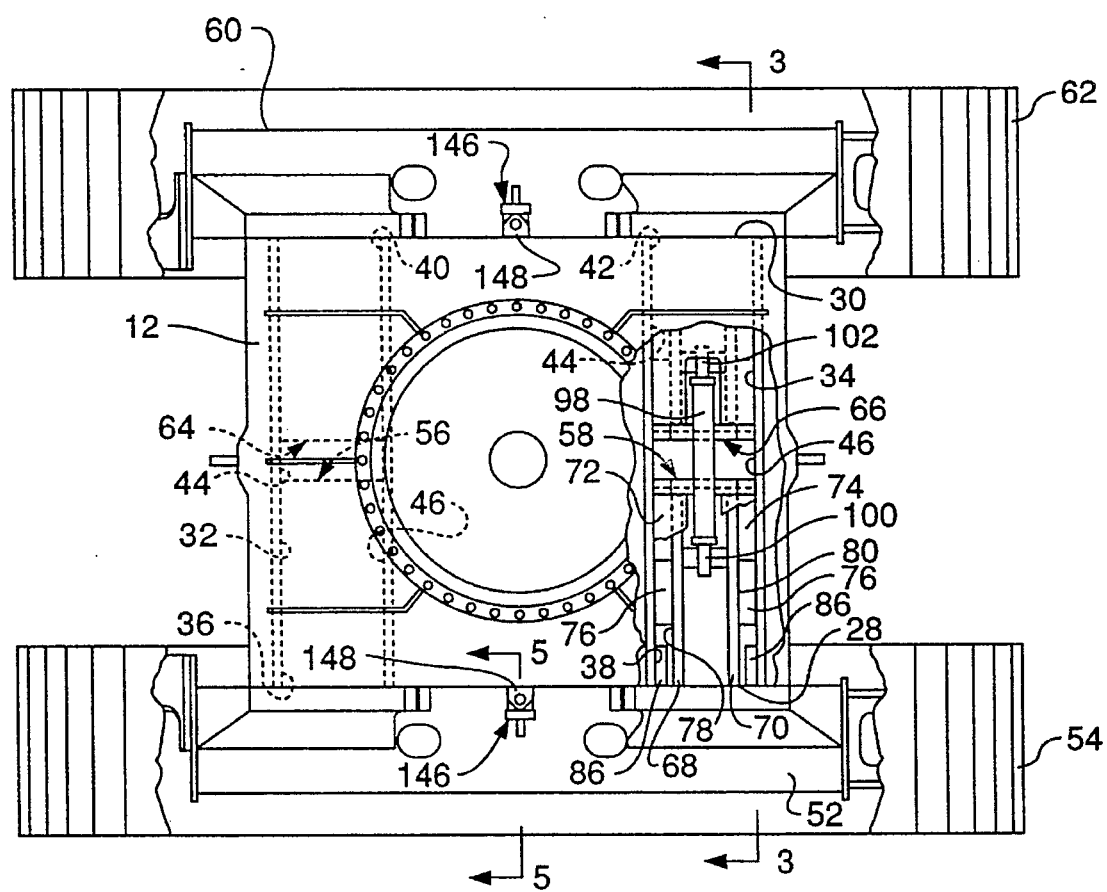
FIG. 2 is a diagrammatic sectional view taken along lines 2—2 of FIG. 1 showing a top view of the undercarriage components.

Each of the beam assemblies 56, 58, 64 and 66 are essentially identical in construction. For the sake of convenience, only one beam assembly will be described, with the understanding that all identical components will be identified by the same reference numeral throughout the drawings. Each beam assembly includes a pair of generally vertically oriented beam members 68 and 70. The beam members are spaced laterally from one another and extend between upper and lower horizontally disposed plate members 72 and 74. An abutment member 76 is affixed to an outer surface 78 and 80 of the respective beam members 68 and 70 (FIG. 2). The abutment member 76 defines an angled face 82 that extends between the upper and lower plates 72 and 74 respectively. Likewise the lower plates 74 form an angled face 84 on a distal end portion thereof. The angled faces 82 and 84 interact with a pair of stop members 86 and 88 to limit the travel of the beam assemblies within their respective receptacles in a manner to be described hereinafter.

The first stop member 86 is positioned adjacent each of the openings 36, 38, 40 and 42 formed in the respective side portions 28 and 30 of the main frame. As shown in FIGS. 2–4, the stop member 86 is shown positioned adjacent the openings 38 and 42 and is attached to each sidewall 44 and 46 (FIG. 2) of the receptacles by a plurality of removable fasteners such as bolts 90. The stop member 86 defines an angled face 92 that is sufficient for mating engagement with the angled face 82 of the abutment member. When the two angled faces are engaged with one another, the outward travel of the beam assembly within the respective receptacle is limited and the face-to-face engagement between the angled surfaces becomes a support surface between the beam assemblies and the main frame.

The second stop member 88 is positioned substantially along the midportion of the receptacles 32 and 34 and is affixed to the lower wall 50 of each receptacle by a plurality of bolts (not shown) or other suitable manner. The stop member 88 defines a pair of angled faces 94 and 96 that extend in opposite directions. Each angled face 94 and 96 has an angle that is the same as the angled face 84 defined by the distal end portion of the lower plate 74 of the opposing beam assemblies 58 and 66 as can best be seen in FIG. 4. When the respective angled surfaces are engaged in this manner, the travel of the beam assemblies toward one another within the respective receptacles and therefore the inward movement of the track roller frames, is stopped.

Referring to FIG. 2 it can be seen that beam assemblies 56 and 64 are positioned within the receptacle 32 for movement in opposition to one another. Likewise, beam assemblies 58 and 66 are positioned in receptacle 34 for movement in opposition to one another. A hydraulic actuator 98 is positioned between each of the opposed pairs of beam assemblies to move them in their respective inward and outward directions. Again, with reference to the beam assemblies 58 and 66 shown in FIGS. 2–4 it can be seen that each hydraulic actuator 98 includes a hydraulic cylinder that has a first end portion 100 or head end that is pivotally connected between the beam members 68 and 70 of the beam assembly 58 (FIG. 2). The second, or rod end portion 102 of the cylinder is pivotally connected between the beam members 68 and 70 of the beam assembly 66. It can be seen that retraction of the cylinder 98 moves the respective beam assemblies against stops 88 and the associated track roller frames to their first position shown in FIG. 4. Conversely, extension of the cylinder moves the beam assemblies to abutting engagement with the stop members 86 and the track roller frames to their second position as shown in FIG. 3.

Referring now to FIG. 6, a control means generally indicated at 104, is shown to direct pressurized fluid to the hydraulic cylinders 98. It can be seen that pressurized hydraulic fluid is directed to the track motors 55 and 63 of the respective traction drive assemblies 24 and 26 from a engine driven pump 106. The pressurized fluid is communicated from the pump 106, through line 107, to a pair of lines 108 and 110. Lines 108 and 110, in turn, direct the pressurized fluid to a pair of manually operable control valves 112 and 114. Control valve 112 selectively directs the pressurized fluid to opposite sides of track motor 55 through lines 116 and 118 to operate the track motor in either a forward or reverse direction depending upon the selected position of the control valve 112. Control valve 114 selectively communicates the pressurized fluid to the track motor 63 through lines 120 and 122. Control valves 112 and 114 may be operable individually or in tandem in a well known manner to direct the pressurized fluid to the respective track motors to drive the machine in the desired manner. The pressurized fluid is directed from the motors to a common line 124 through a plurality of one way check valve 126, 128, 130 and 132 that are respectively positioned in lines 116, 118, 120 and 122. The common line 124 communicates pressurized fluid to a pressure reducing valve 134 which reduces the pressure of the fluid that exits the valve 134 through line 136. Line 136 communicates the pressurized fluid with a two-position, manually operated control valve 138 that is normally positioned within the operator station of the machine. A line 139 communicates the control valve 138 with the rod ends 102 of the hydraulic cylinders 98 while a second line 140 extends from the control valve 138 to the head ends 100 of the hydraulic cylinder 98. A tank line 142 extends between the pressure reducing valve 134 and a tank 144 to return the pressurized fluid to a common reservoir. In the illustrated condition, control valve 138 is directing pressurized fluid to the rod end portions 102 of the cylinder through line 139 and the second line 140 is in communication with the tank 144.

While the hydraulic cylinders 98 are shown to be actuated by the pressurized fluid that is available during operation of the track motors 55 and 63, it is to be understood that any other available source of pressurized fluid would also be suitable. For instance, line 107, which is connected with the engine driven pump 106, may be connected directly to line 124 to communicate pressurized fluid through the pressure relief valve 134 and control valve 138 to the cylinders 98. In doing so, the track motor circuit may be entirely bypassed. Alternatively, pressurized fluid from any one of several hydraulicly driven implements mounted on the machine may be utilzed as a source for pressurized fluid without departing from principles of the subject invention.

A locking means 146 is positioned between the main frame 12 and each of the track roller frames 52 and 60 to maintain the track roller frames in their first position with respect to the frame during shipping or other times when no pressurized fluid is available. Turning to FIGS. 2 and 5, it can be seen that the locking means 146 includes a bifurcated bracket 148 that is generally centered in along the first side 28 of the main frame 12. The bracket 148 defines a pair of spaced horizontally oriented plates 150 and 152 (FIG. 5). Each of the plates 150 and 152 have an bore 154 and 156 respectively that extend through each plate and are positioned for alignment with one another along a common vertical axis. A second bracket 158 having a single horizontally oriented plate 159 is mounted to the track roller frames 52 and 60 (FIGS. 2 and 5) at a substantially central location. Plate 159 defines a bore 160 that extends therethrough. The second bracket 158 is positioned for alignment with the bracket 148 on the main frame such that the bore 160 is aligned with the bores 154 and 156 along their common axis. Being so positioned, a pin 162 may be received within the aligned bores 154, 156 and 160 and thereby maintains the position of the track roller frame with respect to the main frame. By locking the undercarriage at its narrowest position, a width which is legal for transportation of the machine by trailer may be achieved maintained without the requirement of engine operation.

INDUSTRIAL APPLICABILITY

The sequential manipulation of the undercarriage between its extreme gage positions is best illustrated in FIGS. 7–9. In FIG. 7, it can be seen that the first and second traction drive assemblies 24 and 26 are positioned in their first position and are in close proximity to the main frame 12. In this position, the angled faces 84 defined by the lower plates 74 of the respective beam assemblies 64 and 66 are maintained in engagement with the angled faces 94 and 96 of the stop member 88 (position also shown in FIG. 4). In order to move the track roller frames to their second position, it is necessary to raise one of the track roller frames from contact with the ground. In FIG. 7 it can be seen that the second traction drive assembly 26 has been elevated. While not fully shown in the drawing, it is to be understood that the upper frame of the machine is rotated so that the linkage arrangement 20 extends over the second traction drive assembly. The work implement may then be brought into contact with the ground and a downward force applied to the linkage assembly to raise the track roller frame from contact with the ground. When this has been accomplished, the track motor 63 of the second traction drive assembly may be selectively actuated by the manual manipulation of the control valve 114 (FIG. 6). Pressurized fluid is then directed to line 124 and the pressure reduction valve 134 through either of lines 120 or 122 and check valves 130 or 132, depending upon direction of rotation of the track motor. The two-position control valve 138 is shifted to its second position to direct pressurized fluid from line 136 to line 140 and thus the head ends 100 of the hydraulic cylinders 98. As the cylinders 98 are pressurized, the initial movement occurs between the second traction drive assembly and the second side 30 of the main frame 12. This movement will end when the angled face 82 of the abutment member 76 defined by the beam assemblies 64 and 66 engage the angled face 92 of the first stop members 86, as shown in FIG. 8. After the abutment members 76 engage their respective stop members 86, the first side 28 of the main frame 12 will begin movement away from the first track roller frame 52. This movement will continue until the angled faces of the abutment members 76 defined by the beam assemblies 56 and 58 of the first traction drive assembly 24 contact the angled faces 92 of their respective stop members 86. At this point, the track roller frames 52 and 54 will be fully moved to their second position as shown in FIG. 9. When rotation of the track motor is ended, the pressure in line 144 is maintained by the check valves 130 and 132 to securely maintain the traction drive assemblies in their second position. It should be noted that when in the second position, the engagement between the angled faces of the abutment members and the first stop members occurs over a substantial length. Since the area of contact is of a substantial length and it occurs along an angled surface, the transfer of operational forces through the joint is highly effective. This provides enough support at each beam assembly to eliminate the need for bolted joints between these components as has previously been the common practice. With the elimination of the bolted joint, the extensive amount of time need for alignment, assembly and disassembly, as well as the need for additional personnel is also eliminated.

To move the traction drive assemblies 24 and 26 from their second position to their first position, one traction drive assembly is again lifted from contact with the ground and the track motor to that track is operated in either direction as was previously described. The two-position valve 138 is moved by the operator to its original position thereby communicating pressurized fluid from line 136 to line 139 and the rod ends 102 of cylinders 98. At the same time, line 140 is communicated to the tank 144 to evacuate the pressure at the head ends 100 of the cylinders. The sequence of movement of the track roller frames is reversed and will stop when the angled faces 84 of the respective beam assemblies engage the angled faces 94 and 96 of the second stop member. As previously described, the brackets 148 and 158 of the locking means 146 are positioned such that the respective bores 154, 156 and 160 are in axial alignment when the beam assemblies are in this position. When it is desirable to maintain this position in absence of engine operation and therefore an absence of pressurized fluid, the lock pin 162 may be inserted in the aligned bores to lock the track roller frames in their first position.

With an undercarriage as described above, it can be seen that the width between the traction drive assemblies may be varied very quickly without the need for the operator to leave the operator station and without the need for additional personnel or auxiliary equipment. This adds greatly to the versatility of the machine. While a relatively narrow gage may be maintained to stay within legal transportation requirements, a substantially wider gage may be maintained to increase the stability and the operational capacities and therefore the overall versatility of the machine.

Other aspects, objects and advantages of this invention can be obtained from a study of the drawings, the disclosure and the appended claims.

I claim:

1. A variable gage undercarriage arrangement for a construction machine, comprising:

a main frame defining first and second opposing sides, each side defining at least one receptacle opening, said receptacle openings defined by an upper and lower wall and opposing side walls positioned therebetween, said upper and lower walls being spaced from one another a preselected distance;

a first subframe having a traction drive means for propelling the machine mounted thereon and at least one beam assembly defined thereon, said beam assembly being slidably mounted within the receptacle defined in the first side of the main frame for relative movement toward and away from said main frame;

a second subframe having a traction drive means for propelling the machine mounted thereon and at least one beam assembly defined thereon, said beam assembly being slidably mounted within the receptacle defined in the second side of the main frame for relative movement toward and away from said main frame;

at least one hydraulic actuator connected between the first and second subframes and being selectively operable to move the first and second subframes from a first position wherein the respective subframes are spaced from one another a first preselected distance to a second position wherein the respective subframes are spaced from one another a second preselected distance;

an abutment member having an angled face being secured to each beam assembly at a location that is substantially centered between the upper and lower walls of a respective receptacle opening, said angled face having a length greater than one half of the preselected distance between the upper and lower walls; and a pair of first stop members secured to the opposing sides of the main frame immediately adjacent a respective receptacle opening, each of said first stop members being positioned at a location that is substantially centered between the upper and lower walls of the respective receptacle opening and having an angled face that is of an angle and length substantially equal to the angled face of the respective abutment members and being sufficient for mating engagement therewith to provide the sole support between the respective subframes and the main frame when the subframes are in their second position.

2. The undercarriage arrangement as set forth in claim 1 wherein the first and second subframes each define a pair of beam assemblies longitudinally spaced therealong and extending toward the main frame.

3. The undercarriage arrangement as set forth in claim 2 wherein the main frame defines a pair of receptacles that extend between the first and second sides of the main frame and define a first pair of openings on the first side and a second pair of openings on the second side, the first pair of openings being of sufficient size and spacing for receiving the pair of beam assemblies defined by the first subframe and the second pair of openings being of sufficient size and spacing for receiving the pair of beam assemblies defined by the second subframe.

4. The undercarriage arrangement as set forth in claim 3 wherein each of the beam assemblies defines an angled end face on a distal end portion thereof, each beam assembly also defining an abutment member that defines an angled face.

5. The undercarriage arrangement as set forth in claim 4 wherein a first stop member is positioned adjacent each opening defined by the respective receptacles, said first stop members defining an angled face that is of an angle sufficient for mating engagement with the angled face of the respective abutment members positioned within the respective receptacles to provide a travel limit for each beam assembly when the subframes are moved toward their second position.

6. The undercarriage arrangement as set forth in claim 5 wherein a plurality of second stop members are defined within each receptacle and are positioned inwardly of each of the first stop members, said second stop members defining an angled face that is sufficient for mating with the angled face defined on the distal end portion of the respective beam assemblies to provide a travel limit for the beam assemblies when the subframes are moved toward their first position.

7. The undercarriage arrangement as set forth in claim 6 wherein the hydraulic actuator is a hydraulic cylinder that is positioned within each of the respective receptacles, said hydraulic cylinder having a first end portion connected to the beam assemblies of the first subframe and a second end portion connected to the beam assemblies of the second subframe, said hydraulic cylinder being selectively pressurized to extend the end portions away from one another to move the subframes toward their second positions and selectively pressurized to retract the end portions toward each other to move the subframes toward their first positions.

8. The undercarriage arrangement as set forth in claim 1 wherein each of the subframes is a track roller frame having an endless track chain entrained thereabout and a hydrostatic motor operatively engaged with the track chain to drive the track chain about the subframes to propel the machine.

9. The undercarriage arrangement as set forth in claim 8 wherein a control means is provided to actuate the hydraulic actuator only during operation of an engine driven implement pump.

10. The undercarriage arrangement as set forth in claim 9 wherein a locking means is positioned between the main frame and the subframes to selectively prevent the movement of the subframes toward their second position from their first position in absence of operation of the engine driven pump.

11. The undercarriage arrangement as set forth in claim 1 wherein the respective subframes are positioned in relatively close proximity to the main frame in their first position and are spaced from each other and the respective first and second side of the main frame in their second position.

12. A variable gage undercarriage arrangement for a construction machine, comprising:

a main frame defining a pair of side portions and a pair of receptacles extending therethrough between said side portions to define a pair of openings on each respective side portion, said receptacle being defined by an upper and lower wall and opposing sidewalls positioned therebetween, said upper and lower walls being spaced from one another a preselected distance;

a first track roller frame having an endless track chain entrained thereabout, a motor for driving said track chain and a pair of beam assemblies mounted thereon that are of a sufficient size and are spaced from one another a sufficient distance to be slidably received within the receptacles defined in the first side portion of the main frame;

a second track roller frame having an endless track chain entrained thereabout, a motor for driving said track chain and a pair of beam assemblies mounted thereon that are of a sufficient size and are spaced from one another a sufficient distance to be slidably received within the receptacles defined by the second side portion of the main frame;

a pair of hydraulic cylinders positioned within each of the receptacles, each cylinder having a first end portion connected to a beam assembly defined by the first track roller frame and a second end portion connected to a beam assembly defined by the second track roller frame, said cylinders being selectively operable between a first, retracted position wherein the respective track roller frames are spaced from one another a first preselected distance and a second, extended position wherein the respective track roller frames are spaced from one another a second preselected distance, said cylinders being operable only upon actuation of one of said track motors;

an abutment member having an angled face and being secured to each of the beam assemblies at a location that is substantially centered between the upper and lower walls of the receptacles, said angled face having a length greater than one half of the preselected distance between the upper and lower walls of the receptacle; and a pair of first stop members secured to the opposing side walls of each receptacle immediately adjacent the openings thereof, said first stop members being positioned at a location that is substantially centered between the upper and lower walls of the receptacles and having an angled face that is of an angle and length substantially equal to the angled face of the respective abutment members and being sufficient for mating engagement therewith to provide the sole support between each of the subframes and the main frame when the subframes are in their second position.

13. The undercarriage arrangement as set forth in claim 12 wherein each beam assembly defines a distal end portion that defines an angled face.

14. The undercarriage arrangement as set forth in claim 13 wherein a plurality of second stop members are defined within each receptacle and are positioned inwardly of each of the first stop members, said second stop members defining an angled face that is sufficient for mating with the angled face defined by the respective beam assemblies to provide a travel limit for the beam assemblies when the track roller frames are moved toward their first position.

\* \* \* \* \*